United States Patent
Osborne et al.

(10) Patent No.: US 7,970,844 B2
(45) Date of Patent: *Jun. 28, 2011

(54) REPLICATING MESSAGE QUEUES BETWEEN CLUSTERED EMAIL GATEWAY SYSTEMS

(75) Inventors: Robert Osborne, Toronto (CA); Bill Simpson, Brampton (CA); Rod Gilchrist, Oakville (CA)

(73) Assignee: WatchGuard Technologies, Inc., Seattle, WA (US)

( * ) Notice: Subject to any disclaimer, the term of this patent is extended or adjusted under 35 U.S.C. 154(b) by 191 days.

This patent is subject to a terminal disclaimer.

(21) Appl. No.: 12/548,286

(22) Filed: Aug. 26, 2009

(65) Prior Publication Data

US 2009/0320120 A1 Dec. 24, 2009

Related U.S. Application Data

(63) Continuation of application No. 11/103,061, filed on Apr. 11, 2005, now Pat. No. 7,584,256.

(60) Provisional application No. 60/560,970, filed on Apr. 12, 2004.

(51) Int. Cl.
*G06F 15/16* (2006.01)
(52) U.S. Cl. .......................................... 709/206; 714/13
(58) Field of Classification Search .................. 709/206, 709/207; 714/13
See application file for complete search history.

*Primary Examiner* — Andrew Caldwell
*Assistant Examiner* — Taylor Elfervig
(74) *Attorney, Agent, or Firm* — Kory D. Christensen; Stoel Rives LLP

(57) ABSTRACT

A method of "stateful failover" is provided that allows email gateway systems in a cluster to deliver email messages that have been accepted for delivery by a member of the cluster, but has failed with out delivering the messages. The method involves creating a backup copy of the messages that have been accepted for delivery by one email gateway system in the stateful failover cluster on one or more other email gateway systems in the stateful failover cluster. Upon detecting the failure of the email gateway system that accepted the message, another member of the stateful failover cluster that has access to the backup copy of the message queue takes responsibility for the delivery of the messages on the mirrored queue.

18 Claims, 3 Drawing Sheets

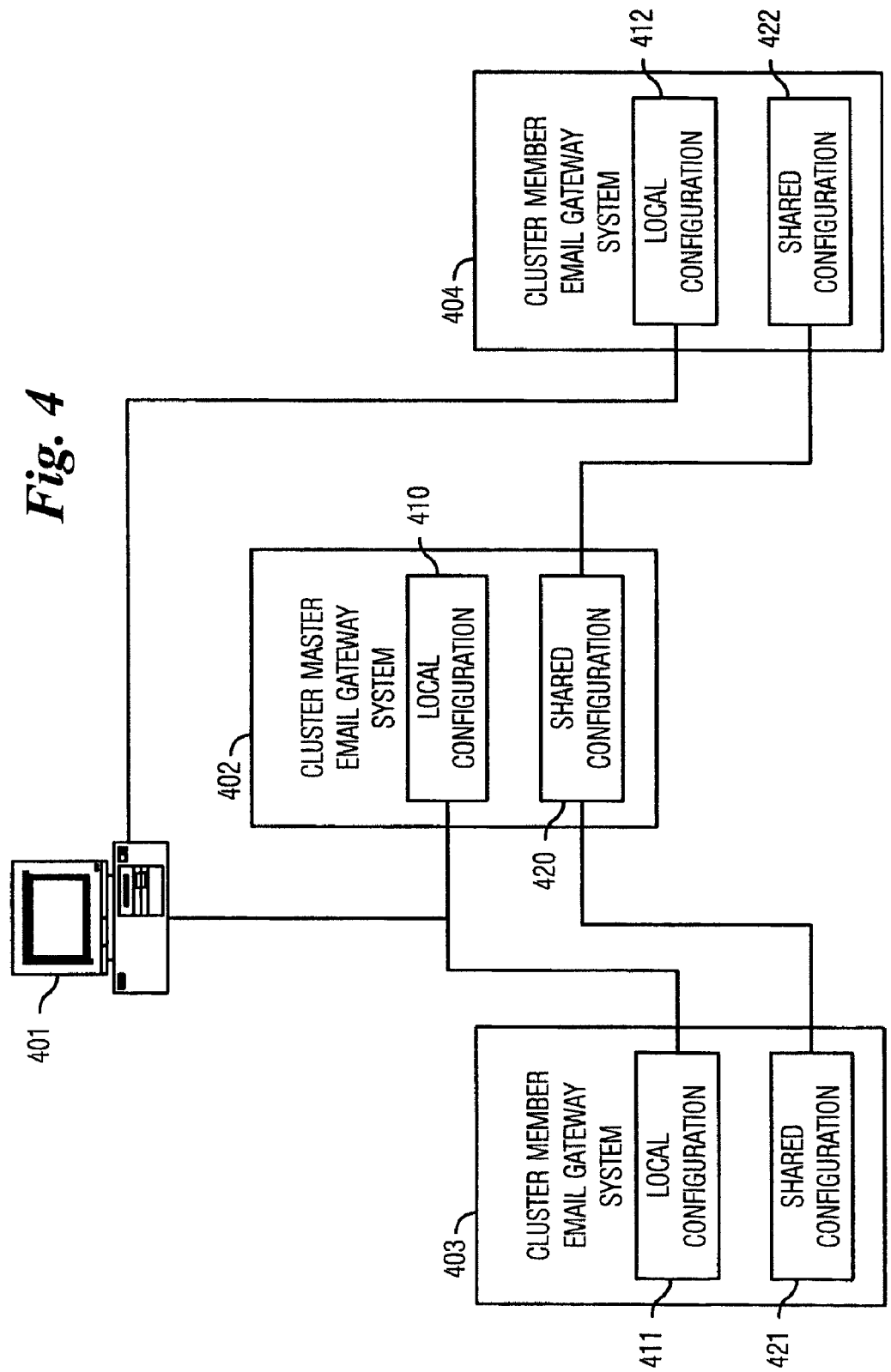

REPLICATING MESSAGE QUEUES BETWEEN CLUSTERED EMAIL GATEWAY SYSTEMS

This application is a continuation of U.S. patent application Ser. No. 11/103,061, filed on Apr. 11, 2005, which claims the benefit of U.S. Provisional Application No. 60/560,970, filed on Apr. 12, 2004, which applications are hereby incorporated herein by reference.

TECHNICAL FIELD

The present invention relates to a method for replicating message queues between electronic message transfer agent (MTA) servers running in a fault-tolerant cluster.

BACKGROUND

The use of the simple mail transfer protocol (SMTP) to transmit electronic messages and email has grown to the point where it is now a mission-critical service. Organizations now view it as being as vital to their everyday operations as the telephone.

Two significant challenges have emerged with this reliance on email. The first challenge is how to ensure timely delivery of all messages. Users now expect messages to be delivered within minutes or even seconds. Generally, message protocols, particularly simple mail transfer protocols (SMTPs), are resilient in ensuring the eventual delivery of messages, but the underlying message transfer agent (MTA) software and its hardware platform do not currently contribute to timely delivery, and may themselves serve to introduce delays into the system by virtue of unreliability.

The second important challenge has arisen from the growing value of each particular message. Email is now being used to transmit much more than simple text. Email is used to transmit information of commercial value (purchase orders, shipping waybills, etc.), legal documents (contracts, agreements, etc.) as well as collaborative information like scheduling, appointments, etc.

Organizations and individuals can no longer afford either a delay or loss of messages.

Major components of email systems that interact via SMTP can be broadly categorized as email clients, email servers and email gateways.

Email clients, like Microsoft Outlook®, provided by Microsoft Corp. of Redmond, Wash., are used to read and manage the local storage of messages for an individual user and serve as end-points of the email system. Users are generally responsible for ensuring that the messages that they receive are backed up and stored safely. In many cases, this will be mandated by policy and standard tools will be provided for this purpose.

Email servers, like Microsoft Exchange™, provided by Microsoft Corp. of Redmond, Wash., are used to host email accounts, provide a delivery point for messages for a mail domain so that individual users can read or collect their personal messages, and may also be used for storage. There is a wide range of sophisticated schemes available for ensuring that the contents of email servers are properly protected against accidental loss.

Email gateways are used to manage the flow of email into and out of private networks, which may contain one or more email servers. Gateways may also serve other functions like email security and hygiene, and some gateways may be characterized as email firewalls due to their emphasis on these functions.

One function of email gateways is that they can accept email from external systems via a public network, such as the Internet, queue them locally for processing, and relay them on to internal email servers where they can be accessed by email clients. Internal email clients and servers may also use the email gateway to manage, queue, and relay messages to external email servers and mail gateways.

While awaiting relay, email messages are typically stored in queues on the email gateway disks. Relay may be instantaneous, but may also be delayed if the target email server is unavailable. The target email server may be unreachable due to a network error, may be temporarily down for maintenance, or may be unavailable for many other reasons. The email gateway will typically be configured to keep re-trying delivery for a number of days.

Email gateways can be deployed on systems that provide some measure of protection against failure, including hardware redundancy and clusters for alternative delivery routes.

The volume of email that is now being sent implies that these message queues can become quite large, sometimes numbering in the thousands or ten of thousands of messages. Many major organizations receive 50,000 messages an hour. If the system cannot deliver messages because of an intervening network router or switch malfunctions, the queue may grow very quickly to tens of thousands or more before the administrator is notified.

While the messages are on the queues of the email gateway, they are vulnerable to loss. Any hardware or software failure on the email gateway may cause the message to be irrevocably lost.

If the message is not lost, it may still be "stuck" on a system that cannot deliver the message. For example, the system motherboard may have failed, requiring that the messages in a queue be manually retrieved (for example, from a disk storage device) if they are to be delivered. This may impose an unacceptable delay.

If the message is lost, there will be no way of recovering and retrying the delivery. The system that has used the email gateway to relay both inbound and outbound email considers the message to have been delivered. The sender has recorded the "delivery" of the message, but the recipient never receives it and, if the recipient is not expecting the message, has no reason to alert the sender to this fact.

The email gateway has therefore become a weak link in the chain of delivery between email clients and email servers, and between email servers. The delay or loss may represent significant cost to an organization. Therefore, a solution to this problem is desired.

SUMMARY OF THE INVENTION

These and other problems are generally solved or circumvented, and technical advantages are generally achieved, by preferred embodiments of the present invention, which provides a system and method for sending and receiving email messages.

In accordance with an aspect of the invention there is provided a method of preventing loss of email messages on an email gateway. In an embodiment the method comprises receiving a message on a 'source' email gateway and storing the email message locally and transmitting to one or more 'sink' email gateways for storage. Receipt of the message by the source email gateway is preferably acknowledged to the originating message source. The message is processed and relayed by the source email gateway to the next system in the delivery path. The source gateway notifies the sink system that the message has been delivered and that it may now be deleted. During the interval between receiving the message and being notified that the message was delivered the sink system monitors the source system, and if the source system is determined to have failed, the sink system raises an alarm for the operator, and if so configured, delivers its copy of the email message.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 4 is a block diagram showing the replication of configuration between email gateways.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
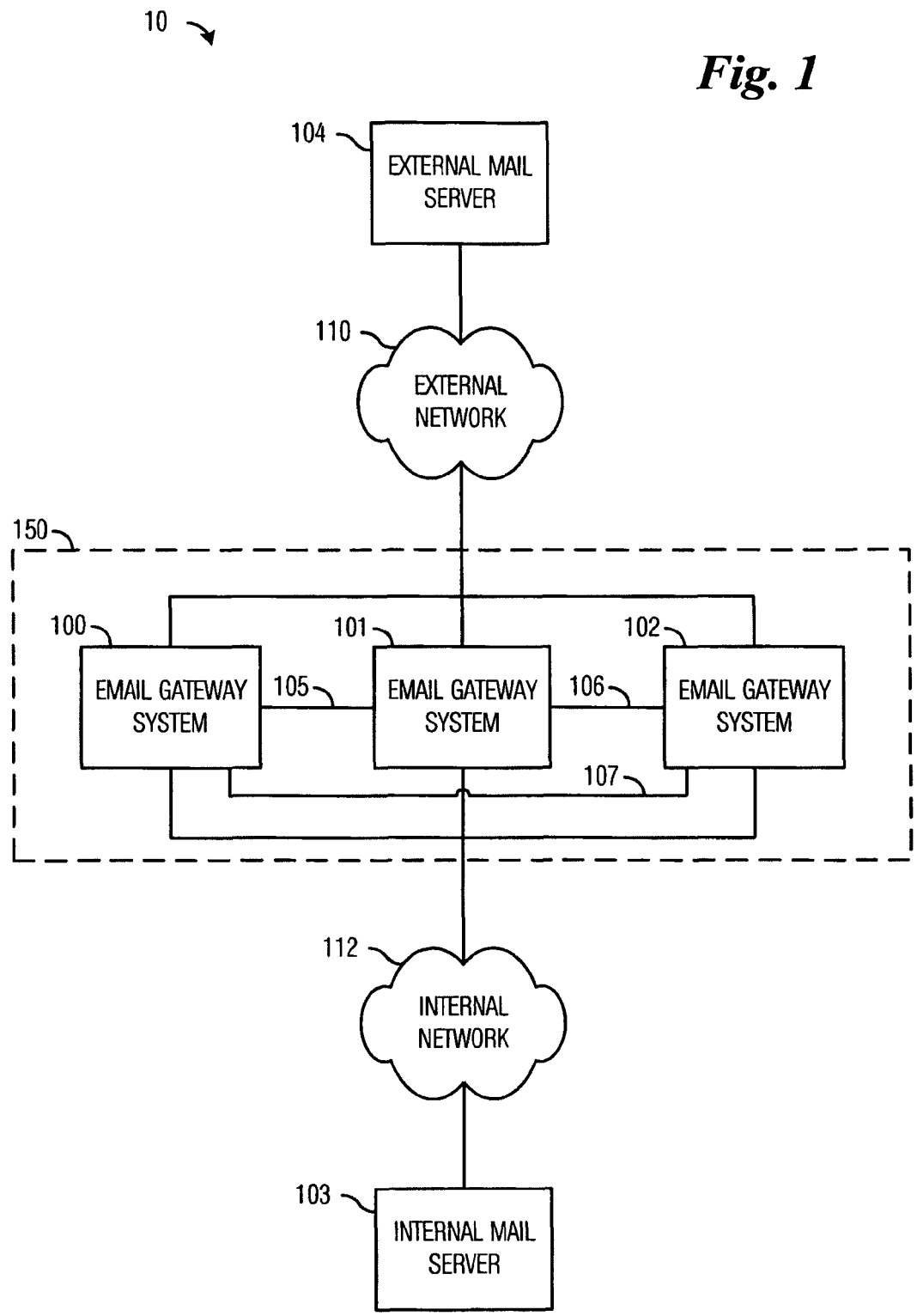
FIG. 1 is a block diagram of the architecture of an embodiment of an email gateway cluster.

FIG. 1 illustrates a network 10 in accordance with an embodiment of the present invention. It should be noted that one of ordinary skill in the art will realize that the network 10 has been simplified to better illustrate features of the present invention. Well-known elements have not been shown, but are nonetheless part of a network embodying features of the present invention. For example, a network embodying the present invention may include power supplies, maintenance systems, gateways, routers, firewalls, and the like.

Generally, the network 10 comprises a stateful failover cluster 150 communicatively coupled to an external network 110 and an internal network 112. The external network 110 and the internal network 112 may be a local-area network (LAN), a wide-area network (WAN), the Internet, or the like, and may include private or public network systems. In a preferred embodiment, the external network 110 comprises the Internet, and the internal network 112 comprises a LAN or WAN. It should be noted that the communications links are illustrated as a wired communications link for illustrative purposes only, and may include either a wired link and/or a wireless link.

The stateful failover cluster 150 preferably comprises a plurality of email gateway systems, such as email gateway systems 100-102, wherein each email gateway system is communicatively coupled to at least one other email gateway system for the purpose of sending and receiving SMTP messages. In a preferred embodiment, SMTP is utilized as the protocol to transmit and receive messages. Email messages may include, for example, text, audio, video graphics, or any other form of communication that is to be transmitted from one party to another.

It should be noted that the communications interface between the email gateway systems 100-102, the internal network 112, and the external networks 110 are illustrated as three physical links for illustrative purposes only. These communications interfaces may comprise logical communications interfaces over one or more physical links. For example, the email gateway systems 100-102 may be configured to communicate over a single link, such as an Ethernet link, using multiple IP addresses. Other configurations may be used.

Each of the email gateway systems 100-102 may have the same configuration for the purposes of delivering email, and each of the email gateway systems 100-102 may accept email from external email servers (e.g., 104) for the same email domains, forwarding such email messages to the same internal email servers (e.g., 103). Each email gateway system 100-102 may forward email messages received from internal email servers using the same settings and applying the same policies for delivery.

In operation, when the internal email server 103 transmits a message to an external email server 104, the internal email server 103 transmits the mail message to at least one of the three email gateway systems 100-102. The routing of the messages may be based on, for example, the local domain name service (DNS) configuration or via a load balancing scheme. The facility that arranges for the message to be sent to a particular one of the email gateway systems 100-102 for processing is not shown in the diagram since such facilities are well known to those skilled in the art and it is not necessary to understand concepts of the instant invention.

The following paragraphs illustrate the operation of the email gateway systems 100-102. Generally, the email gateway systems 100-102 process email messages received from external email server 104 and relay the processed email messages to the internal email server 103, and the email gateway systems 100-102 process email messages received from internal email server 103 and relay the processed email messages to the external email server 104.

In normal operation, email messages are sent from an internal email server 103 to an external email server 104 using SMTP via TCP/IP network. The internal email server 103 may not know how to deliver messages to the external email server 104, and is configured to send all messages to unknown mail destinations to a specified email gateway system, which is one of email gateway systems 100-102.

The receiving email gateway system, for example email gateway system 100, receives the email message, assigns it a unique message ID, and stores it in its message queue (not shown). Generally, the message queue comprises a storage mechanism such as a folder, directory or a set of folders or directories, a database, or the like that stores the files making up each individual message. In an embodiment, the message queue is stored on a hard disk of the respective email gateway system.

The receiving email gateway system replicates a copy of the queued messages to one or more sink email gateway systems, which stores one or more backup copies of the message. In the embodiment of the present invention illustrated in FIG. 1, email gateway system 101 acts as a sink email gateway system for email gateway system 100 via a communications link 105, email gateway system 102 acts as a sink email gateway system for email gateway system 101 via a communications link 106, and email gateway system 100 acts as a sink email gateway system for email gateway system 102 via a communications link 107. In a preferred embodiment, the communications links 105-107 are dedicated communications links.

The receiving email gateway system, such as email gateway system 100, applies processing to the queued message as its policies dictate, which processing may include virus scanning, content filtering, other email security and hygiene filters, or the like. The receiving email gateway system attempts to deliver the email message to the external email server 104. If the receiving email gateway system 100 succeeds, it will notify its sink (e.g., email gateway system 101) using the unique message ID that the message has been delivered, at which point the sink email gateway system may delete the message from its storage.

In another embodiment, the receiving email gateway system may apply policy processing prior to transmitting a copy of the messages to one or more sink email gateway systems. In this embodiment, the receiving email gateway system may also transmit processing information such as status flags, or the like, that indicate the results of applying the policies. This embodiment may reduce processing requirements by only applying policies once.

In normal operation, email messages are sent from an external email server 104 to an internal email server 103 using SMTP via a TCP/IP network. The external server 104 looks up the IP address to which email messages are to be sent for the domain that is served by internal email server 103. This lookup will typically resolve one of email gateway systems 100-102 depending on the DNS configuration. Assuming for this example that it is email gateway system 101, an SMTP connection will be initiated by external email server 104 to email gateway system 101 and the message will be delivered.

The receiving email gateway system, in this example email gateway system 101, receives the email message, assigns it a unique message ID and stores it in its message queue. A preferred embodiment email gateway system 101 uses the communications link 106 to replicate the message on email gateway system 102. The communications link 106 may be a shared link or a dedicated link, but is preferably a dedicated link.

The email gateway system 101 applies processing to the queued message as its policies dictate, which processing may include virus scanning, content filtering, other email security and hygiene filters, or the like. The email gateway system 101 attempts to deliver the email message to the internal email server 103. If the email gateway system 101 succeeds, it will notify its sink (e.g., email gateway system 102) using the unique message ID that the message has been delivered, at which point email gateway system 102 may delete the message from its storage.

In both of the inbound and outbound examples previously described, all email messages are redundantly stored on two of the three email gateway systems.

Figure 2:
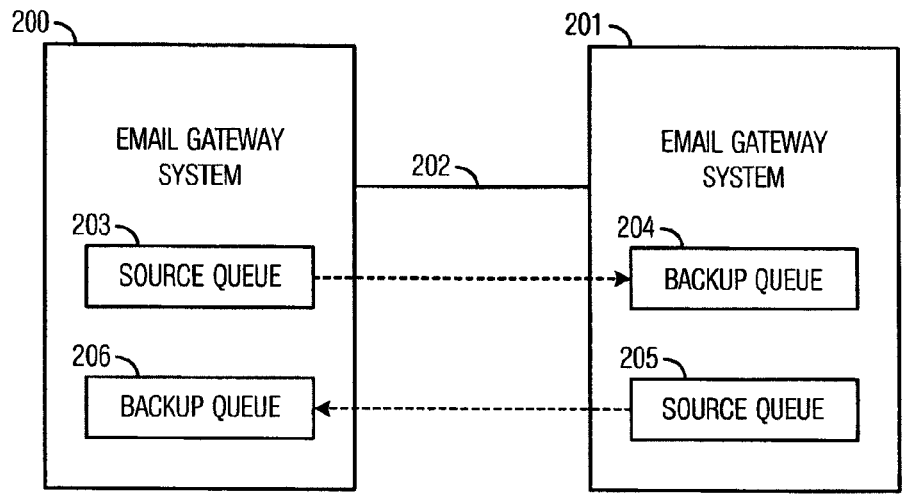
FIG. 2 is a block diagram showing a portion of FIG. 1 in detail, illustrating the communication between two email gateways in a stateful failover cluster.

In FIG. 2, a stateful failover cluster embodiment 250 comprising two email gateway systems 200, 201 having respective source message queues 203, 205, respectively, and backup message queues 204, 206, respectively, is shown. The following paragraphs illustrate a sequence of processing in the event that the source email gateway system 200 stops delivering mail after it has received an email message and stored the email message on the email gateway system 201 in accordance with an embodiment of the present invention.

In FIG. 2, email gateway system 200 is a designated source for email gateway system 201, and email gateway system 201 is a designated sink for email gateway system 200. The email gateway system 201 monitors the email gateway system 200 using a network link 202 by sending it query messages. If the email gateway system 201 receives no response to the query from the email gateway system 200, then the email gateway system 201 assumes that the email gateway system 200 is off-line. The email gateway system 201 then carries out its configured actions, which might include taking over responsibility for delivering the messages in the backup message queue 204 (the email messages sent to it by email gateway system 200) and delivering all the messages found there, alerting the administrator using email or an SMTP trap that the email gateway system 200 is not responding to queries or by displaying a message on its local console. The administrator may then take corrective actions, including manually commanding the sink email gateway system 201 to deliver messages in its back message queue 204.

When the email gateway system 200 comes back online, it sends a message to the email gateway system 201. The two email gateway systems 200, 201 then communicate over the network link 202 to synchronize their queues, namely source message queue 203 with backup message queue 204 and source message queue 205 with backup message queue 206. Email messages that have been successfully delivered by email gateway system 201 may be removed from the message queue of email gateway system 200.

The synchronization may also account for partial deliveries. For example, a message to multiple recipients may have been delivered to some but not all of the intended recipients. In this situation, it is preferred that the synchronization process results in the message being transmitted to only those recipients that have not received the message, preventing the other recipients from receiving duplicate messages.

Figure 3:
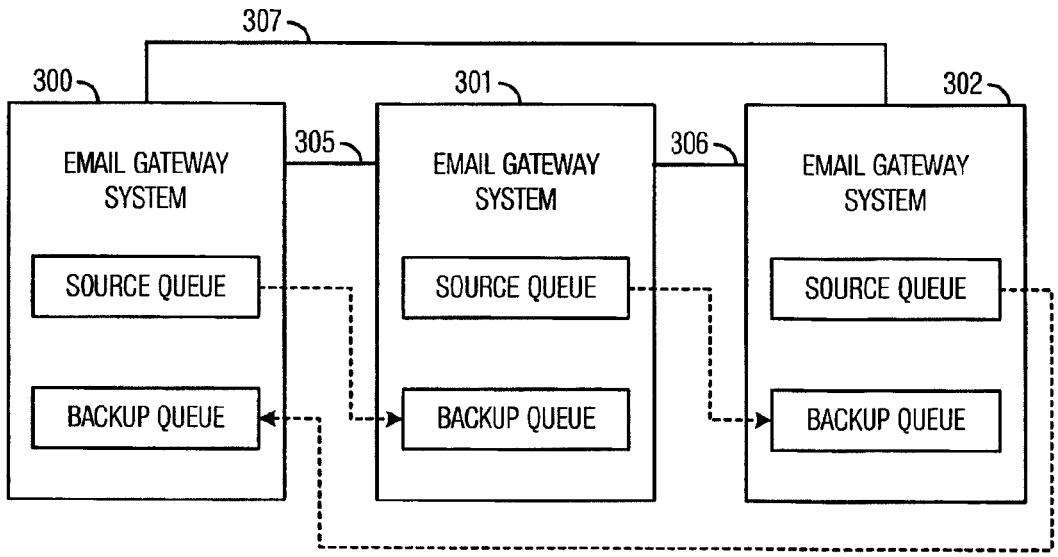
FIG. 3 is a block diagram showing a portion of FIG. 1 in detail, illustrating the relationship between three email gateways in a stateful failover cluster.

FIG. 3 illustrates how an email gateway can be connected and specified to act as sources and sinks in a stateful failover cluster, wherein email gateway system 300 is communicatively coupled to email gateway system 301 via communications link 305, email gateway system 301 is communicatively coupled to email gateway system 302 via communications link 306, and email gateway system 302 is communicatively coupled to email gateway system 300 via communications link 307. In this configuration, the email gateway systems 300-302 may be configured such that:

Email gateway system 300 is a source for email gateway system 301;
Email gateway system 301 is a source for email gateway system 302;
Email gateway system 302 is a source for email gateway system 300;
Email gateway system 301 is a sink for email gateway system 300;
Email gateway system 302 is a sink for email gateway system 301; and
Email gateway system 300 is a sink for email gateway system 302.

Preferably, the communications links 305-307 are dedicated communications links.

The daisy-chain architecture illustrated in FIG. 3 may be extended to include any number of email gateway systems in the cluster, or the members of the cluster may be connected in subclusters of two or more email gateways. A failure of any one system is quickly remedied by re-assigning the source and sink designations among email gateways.

Current industry practice for large email transmission and relay facilities is to use large, powerful and expensive mail delivery processing nodes each with 'hot swappable' redundant components such as disk drives and power supplies. These processing nodes are typically connected to a storage network so that all state information such as configuration and email messages that have not yet been delivered are not stored on the mail delivery node itself. These storage networks are themselves large, powerful and expensive with a significant number of hot swappable redundant parts.

Heavy incoming email load is typically divided among a number of mail delivery nodes either randomly or with each node serving a specific group or groups of individual mail recipients. The load distribution can be done using a 'load balancer' machine that exposes a single IP address to the world, or by using 'MX' DNS records that result in a set of different IP addresses being supplied for incoming message delivery in a round robin fashion.

When mail queues are stored on a storage network and a number of mail delivery nodes can access the storage network, if one mail delivery node fails, the messages that it has queued for delivery can readily be moved to a delivery queue belonging to an alternate mail delivery node.

This system is complex in its arrangement, demanding in its management and expensive.

The instant invention offers a different arrangement of resources. With mail queue replication happening directly and automatically from node to node, the redundancy advantages of the current industry practice can be retained while the number of different types of nodes in the system can be reduced to one.

With a redundant mail delivery system consisting of only a single type of node many things can be simplified, including administration and failure handling and scaling.

Administration can be simplified because there is only one type of node to administer and since there is only one manufacturer involved the administration interface can be completely consistent in form and function. Also, since the nodes are mostly the same in configuration and it is possible to administer them as a cluster, many configuration items can be automatically replicated to all the other nodes.

FIG. 4 illustrates an example of administration of a stateful failover cluster, e.g., stateful failover cluster 150, in accordance with an embodiment of the present invention. In this embodiment, one of the email gateway systems may be configured as a "cluster master" that may transmit (possibly adapted) configuration changes along to other members of the stateful failover cluster.

A user, e.g., a system administrator, preferably connects to a cluster master email gateway system 402 via web browser 410 running on a network device communicatively coupled to the cluster master email gateway system 402, Using the web browser 401, the user is able to modify a local configuration store 410 and/or a shared configuration store 420 of the cluster master email gateway. Modifications made to the shared configuration store 420 of the master email gateway system 402 are propagated to corresponding shared configuration store 421 and 422 of the member email gateway systems 403 and 404. The modifications may be propagated either manually or automatically. Manual propagation may be initiated by the user entering one or more commands via the web browser 410 to "push" the shared configuration store 420 (or just the modifications) to a specific email gateway system, such as cluster member email gateway systems 403 and/or 404, or a group of email gateway systems. Alternatively, modifications made to the shared configuration store 420 may be automatically propagated to other email gateway systems.

Changes to the local configuration stores 411 and 412 of the cluster member email gateways 403 and 404, respectively, may be made by connecting via the web browser 401 directly to the corresponding cluster members 403 and 404. Preferably, the shared configuration stores 421 and 422 on the cluster member email gateway systems 403 and 404 can not be changed via direct web browser connection to the non-master cluster members 403 and 404, but rather are modified via propagating changes to the shared configuration store 420 of the cluster master email gateway system 402.

Examples of configuration information that may be stored in the local configuration stores 410, 411, and 412 of the email gateway systems 402, 403, and 404 may include:
  networking settings such as host name and IP address for each network interface and,
  connection information about how the email gateway connects to other email gateways in the cluster and whether it is a cluster member or a cluster master.

Examples of information that may be stored in the shared configuration stores 420, 421, and 422 of the email gateway systems 402, 403, and 404 may include:
  pattern based filters to allow or stop individual messages from being sent or received based on whether patterns match text in their headers or content;
  'black hole' lists of IP addresses not to accept email from;
  policy for rejecting incoming messages based on specific characteristics such as unknown recipient, invalid DNS lookup of sending IP address or 'mail from' headers that don't contain fully qualified domain names;
  spam protection configuration such as which filtering layers to enable, how aggressive to be at filtering and what to do with mail determined to be spam (drop, label in the subject line, deliver to an alternate mail box, etc.);
  mappings to translate email addresses for individual users between internal and external formats;
  vacation notifications for individual users to configure auto-response messages that should be returned to the sending address when email is received for that user;
  configuration for the connection to and accessing of external databases of users;
  which domains to accept email for;
  which host to deliver messages for a specific user to;
  how often and for how long to retry mail deliveries and when to warn the administrator and sender of a delivery failure;
  how to segment users into groups and what delivery policies to apply to those groups (some groups may be able to send email attachments while others are blocked, or a specific group may have a specific annotation attached to their messages); and
  how much and what type of logging information to collect on individual messages.

In general, it is preferred that the shared configuration store 420, 421, and 422 includes configuration information that needs to be the same for all cluster members 402, 403, and 404, e.g., that information which allows all the email gateways 402, 403, and 404 to be able to deliver a message in the same way independently of which of them received the message. The local configuration store 410, 411, and 412 contains only that information that must be different between the email gateways in order for them to operate.

It should be noted that although FIG. 4 illustrates an administrator 401 connecting to the cluster master email gateway system 402 via a web browser 401, the administrator may use a dedicated cluster management console device in place of the cluster master email gateway system 402. The cluster management console would have the ability to propagate configuration changes but would not itself deliver email.

Failure handling is also simplified in the case of a single node type. There is less to understand about failure mechanisms and failed systems and fewer redundant components to stock. Administration related to failure can be all part of a single consistent administration interface.

Upgrading hardware and software becomes simpler as well. Taking a node off line and bringing back online is closely related to the administration involved in dealing with failure handling. The administration mechanisms for the two operations can either be the same or at least very similar. The mail delivery network can be scaled easily as well. Additional nodes can be added to the system and integrated with it without having to stop mail processing. Again, this is a very similar mechanism to recovery from a failure and therefore, solving the failure problem makes scaling easier to implement.

The simplifications and cost advantages involved in having only a single type of mail processing nodes allows the benefits of highly available mail processing to be affordable and practical for smaller organizations than the current industry practice configuration. It also allows smaller, cheaper and lower performance processing nodes to be built to serve this newly available market.

The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An email gateway server configured for coupling to an email gateway cluster for processing an email, said cluster comprising at least a second email gateway server, said email gateway server comprising:
   a network connection for receiving the email; and
   a processor configured to relay the email toward a destination and to assign a unique identifier to the email;
   said processor further configured to copy the email and the unique identifier to said second email gateway server, the second email gateway server being configured to relay the email toward the destination should the relay of the email by the email gateway server fail; and
   said processor further configured to relay the email toward the destination or the second email gateway server, wherein the relaying includes the email gateway server sending the second email gateway server the unique identifier when the email gateway server has relayed the email toward the destination, the second email gateway server being configured to cooperate with the email gateway server by:
      monitoring the receipt of the unique identifier from the email gateway server; upon determining that a preselected time period has passed without receiving the unique identifier, deeming the relaying of the email toward the destination by the email gateway server to have failed; and relaying the email toward the destination.

2. The email gateway server of claim 1, wherein the copying includes communicating the email via a secure dedicated network link between the email gateway server and the second email gateway server.

3. The email gateway server of claim 1, wherein said second email gateway server is further configured to detect failure of the email gateway server, and wherein said email gateway server is further configured to synchronize with the second email gateway server after the email gateway server is restored to service.

4. The email gateway server of claim 1 wherein the email gateway server is further configured to process the email in accordance with a policy before the relaying.

5. The email gateway server of claim 4, wherein the policy includes at least one of virus scanning, content filtering, security processing, hygiene filters, and combinations thereof.

6. The email gateway server of claim 4, wherein the processing the email is performed prior to the copying the email to said second email gateway server.

7. The email gateway server of claim 6, wherein the email gateway server is further configured to transmit status information corresponding to the processing the email to the second email gateway server.

8. A source email gateway system for replicating email messages in a stateful failover cluster, the source email gateway system comprising:
   a network connection for receiving an email message to be transmitted to a destination; and
   a processor for assigning a unique identifier to the received email message;
   the processor further configured to transmit the email message and the unique identifier from the source email gateway system to one or more sink email gateway systems in the stateful failover cluster;
   the processor further configured to acknowledge receipt of the email message by the source email gateway system;
   the processor further configured to forward the email message toward the destination;
   the processor further configured to determine if the email message was successfully forwarded;
   when the email message was successfully forwarded, the processor notifies the one or more sink email gateway systems to recover storage resources associated with the email message by identifying the successfully forwarded email message with the unique identifier; and
   when the email message was not successfully forwarded, as determined by the processor not notifying the one or more sink email gateway systems with the unique identifier, the one or more sink email gateway systems forward the email message by the one or more sink email gateway systems.

9. The source email gateway system of claim 8, wherein the source email gateway system and the one or more sink email gateway systems utilize simple mail transfer protocol (SMTP).

10. The source email gateway system of claim 8, wherein the acknowledging is performed after the transmitting to the one or more sink email gateway systems is complete.

11. The source email gateway system of claim 8, wherein the source email gateway system is further configured to process the email message in accordance with a policy before the forwarding.

12. The source email gateway system of claim 11, wherein the policy includes at least one of virus scanning, content filtering, security processing, hygiene filters, and combinations thereof.

13. The source email gateway system of claim 11, wherein the processing the email message is performed prior to the transmitting the email message to the one or more sink email gateway systems.

14. The source email gateway system of claim 13, wherein the source email gateway system is further configured to transmit status information corresponding to the processing the email message to the one or more sink email gateway systems.

15. The source email gateway system of claim 8, wherein the source email gateway system is further configured to share delivery configuration information with other servers in the cluster.

16. The source email gateway system of claim 8, wherein the transmitting is performed via a secure dedicated communications link between the source email gateway system and the one or more sink email gateway systems.

17. The source email gateway system of claim 8, wherein the source email gateway system is further configured to send a command to the one or more sink email gateway systems to deliver the email message upon a failure of the source email gateway system.

18. A system for processing an email by a plurality of email gateway servers coupled in a cluster, the system comprising:
- means for receiving the email by a first email gateway server, the first email gateway server being configured to relay the email toward a destination and to assign a unique identifier to the email;
- means for copying the email and the unique identifier to a second email gateway server, the second email gateway server being configured to relay the email toward the destination should the relay of the first email by the first email gateway server fail; and
- means for relaying toward the destination by the first email gateway server or the second email gateway server, wherein relaying includes the first email gateway server sending the second email gateway server the unique identifier when the first email gateway server has relayed the email toward the destination, the second email gateway server monitoring the receipt of the unique identifier from the first email gateway server and, upon determining that a determined time period has passed without receiving the unique identifier, the second email gateway server deeming the relaying of the email toward the destination by the first email gateway server to have failed, and relaying the email toward the destination by the second email gateway server.

\* \* \* \* \*